(12) United States Patent
Barnier

(10) Patent No.: US 7,801,486 B2
(45) Date of Patent: Sep. 21, 2010

(54) COMMUNICATION SYSTEM COMPRISING MASTER AND SLAVE HANDHELD APPARATUSES

(75) Inventor: Laurent Barnier, Roquefort les Pins (FR)

(73) Assignee: NXP B.V., Eindhoven (NL)

( * ) Notice: Subject to any disclaimer, the term of this patent is extended or adjusted under 35 U.S.C. 154(b) by 551 days.

(21) Appl. No.: 11/722,086

(22) PCT Filed: Dec. 14, 2005

(86) PCT No.: PCT/IB2005/054242

§ 371 (c)(1),
(2), (4) Date: Jun. 18, 2007

(87) PCT Pub. No.: WO2006/064480

PCT Pub. Date: Jun. 22, 2006

(65) Prior Publication Data

US 2009/0011753 A1 Jan. 8, 2009

(30) Foreign Application Priority Data

Dec. 17, 2004 (EP) .................... 04300915

(51) Int. Cl.
*H04B 7/00* (2006.01)
(52) U.S. Cl. .................. 455/41.2; 455/410; 455/411; 455/414.1; 455/414.3; 455/445; 455/11.1; 455/550.1; 455/552.1; 455/553.1; 340/5.61; 340/5.8; 340/5.81; 340/10.1; 340/10.42
(58) Field of Classification Search ........ 455/41.1–41.3, 455/410, 411, 414.1–414.4, 415, 445, 11.1, 455/550.1, 552.1, 553.1; 340/5.81, 10.1, 340/10.5, 10.42, 5.61, 5.8
See application file for complete search history.

(56) References Cited

U.S. PATENT DOCUMENTS

| | | | | |
|---|---|---|---|---|
| 6,405,027 | B1 * | 6/2002 | Bell | 455/403 |
| 6,892,052 | B2 * | 5/2005 | Kotola et al. | 455/41.2 |
| 7,263,345 | B2 * | 8/2007 | Kotola et al. | 455/403 |
| 7,389,118 | B2 * | 6/2008 | Vesikivi et al. | 455/517 |
| 7,565,108 | B2 * | 7/2009 | Kotola et al. | 455/41.2 |
| 2003/0114898 | A1 | 6/2003 | Von Arx et al. | |
| 2004/0203378 | A1 | 10/2004 | Powers | |

FOREIGN PATENT DOCUMENTS

| | | |
|---|---|---|
| WO | 2003081787 A2 | 10/2003 |
| WO | 2006021846 A1 | 3/2006 |

* cited by examiner

*Primary Examiner*—Tuan A Tran

(57) ABSTRACT

The invention relates to a communication system comprising:—a master handheld apparatus (100) comprising a first near field communication device a first wireless communication device, a current session being held by the master handheld apparatus (100), a slave handheld apparatus (130) comprising a second near field communication device and a second wireless communication device, the first and second near field communication devices being adapted to exchange identification information when they are held next to each other so as to initiate a communication link (140) between the first and second wireless communication devices, the first and second wireless communication devices then enabling the slave handheld apparatus (130) to join the current session through the communication link (140).

16 Claims, 3 Drawing Sheets

COMMUNICATION SYSTEM COMPRISING MASTER AND SLAVE HANDHELD APPARATUSES

FIELD OF THE INVENTION

The present invention relates to a communication system comprising a master handheld apparatus, a current session being held by said master handheld apparatus, and at least one slave handheld apparatus, said slave handheld apparatus wishing to join the current session.

The invention also relates to a master handheld apparatus and to a slave handheld apparatus comprised in such a communication system.

The invention finally relates to a communication method between the master handheld apparatus and the slave handheld apparatus.

This invention finds its application, for example, in the field of mobile phones or personal digital assistants PDAs, the current session being a conference call or an audio/video display.

BACKGROUND OF THE INVENTION

A conventional solution for a slave mobile phone to join a pre-established call between a master mobile phone and a remote communication apparatus requires the use of additional services such as conference calls, said services being provided by a Mobile Network Operator. All Mobile Network Operators do not support this service. Most of the time, this service requires a subscription, and additional fee.

Such a solution requires that the master mobile phone which wants to enable the conference call:
  suspends the pre-established call,
  gets the phone number of the joining slave mobile phone,
  dials the slave mobile phone (assuming that this feature is supported by the master mobile phone and the Mobile Network Operator),
  waits until a second call between the master and slave mobile phones is established,
  links the two calls by a mechanism provided by the Mobile Network Operator.

A similar situation may occur when the master mobile phone user takes a picture and wants to send it. The following steps need to be carried out:
  loading/activating the transfer application (pressing several keys, going through menu to do so) on the master mobile phone,
  making the slave mobile phone in a "receptive state for receiving the picture (also by pressing keys and going through menu),
  establishing a communication link between the master and slave mobile phones, and
  once the communication has been established, sending the picture, for example by pressing a key.

The above-described solutions are not satisfactory and extremely complex from a user point of view, since they require a major involvement from the user. According to the example of the conference call, establishing a second call is already a challenge on most of the mobile phones today, and, in addition to this complexity, the user must know how to activate the conference call service of the Mobile Network Operator. As a matter of fact, whereas mobile phone users are familiar with the basics functions provided by the mobile phones (e.g. dialing up, answering), they are extremely unfamiliar with advanced functions such as call forwarding or conferencing.

These solutions are also expensive. Indeed, the additional second call will be charged to the caller's account. Such a solution is acceptable when the master and slave mobile phones are not collocated. It is not acceptable when the two mobile phones are physically nearby.

SUMMARY OF THE INVENTION

It is an object of the invention to propose a communication system enabling a slave handheld apparatus to join a current session held by a master handheld apparatus, said slave handheld apparatus being in the proximity of the master handheld apparatus, in a more convenient way for the user than the one of the prior art.

In accordance with the present invention, there is provided a communication system comprising:
  a master handheld apparatus comprising a first near field communication device a first wireless communication device, a current session being held by said master handheld apparatus,
  a slave handheld apparatus comprising a second near field communication device and a second wireless communication device, the first and second near field communication devices being adapted to exchange identification information when they are held next to each other so as to initiate a communication link between the first and second wireless communication devices, said first and second wireless communication devices then enabling the slave handheld apparatus to join the current session through the communication link.

As a consequence, when holding the near field communication devices next to each other, the communication between the master and the slave handheld apparatuses is initiated without any other involvement of the user of the handheld apparatus, which is a much more convenient solution for the user than the one of the prior art.

Beneficially, the first and second near field communication devices are of the NFC type and the first and second wireless communication devices comprise a Bluetooth™ or a Wi-fi transmitting/receiving interface. Such a solution is not expensive since the Bluetooth™ or the Wi-fi communication link thus created is not charged to the user account.

The present invention also extends to the master handheld apparatus comprised in such a communication system, to the slave handheld apparatus comprised in such a communication system and to a communication method between the master handheld apparatus and the slave handheld apparatus.

According to an embodiment of the invention, the master or slave handheld apparatus further comprises a memory for storing context parameters associated with said handheld apparatus, said context parameters defining data to be transmitted over the communication link, the current session being joined as a function of the context parameters.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
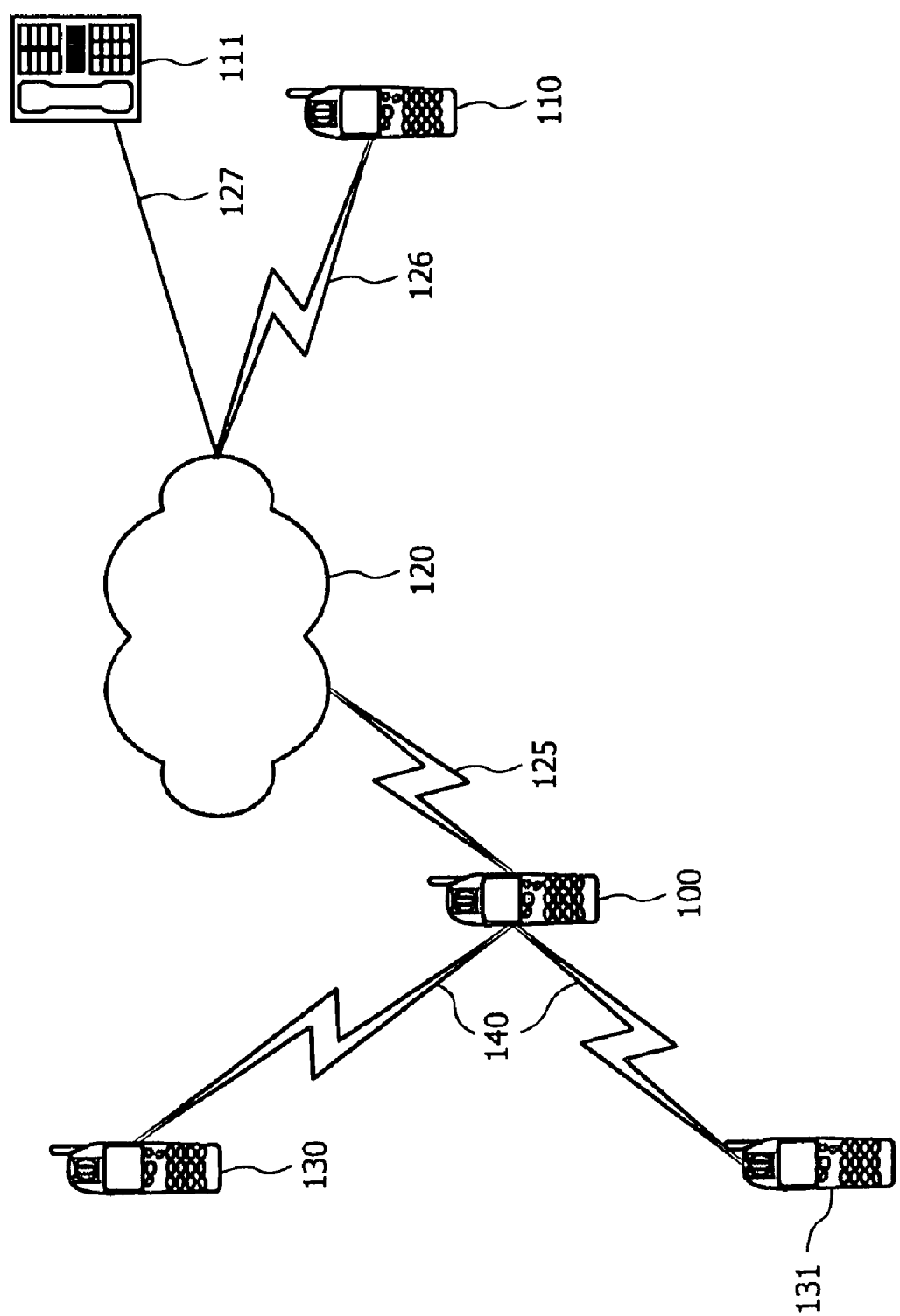
FIG. 1 shows an embodiment of a communication system in accordance with the invention.

Referring to FIG. 1, a communication system in accordance with the invention is depicted in the case of a conference call.

Such a communication system comprises a master handheld apparatus 100, e.g. a mobile phone. A pre-established call has been placed between said master handheld apparatus 100 and a remote communication apparatus over a communication network 120 via a wireless connection 125. The remote communication apparatus can be another mobile phone 110 connected to the communication network 120 via a wireless connection 126 or a fixed landline or wireless phone 111 connected to the communication network 120 via a fixed line connection 127. The master handheld apparatus comprises a first near field communication device and a first wireless communication device (not represented).

The communication system also comprises a slave handheld apparatus 130 or 131, e.g. a mobile phone, in the neighborhood of the master handheld apparatus. Said slave handheld apparatus comprises a second near field communication device and a second wireless communication device (not represented).

According to an embodiment of the invention, the first and second near field communication devices are of the NFC type. NFC is described for example in the documents ECMA 340: Near Field Communication Interface and Protocol (NFCIP-1) dated December 2002, and ECMA 352: NFC Interface and Protocol-2 (NFCIP-2). However, the invention is not limited to this embodiment. The near field communication devices may alternatively be based on colored lights, LED flashing or any other technology provided that the slave handheld apparatus can communicate with the master handheld apparatus when they are close to each other.

According to an embodiment of the invention, the first and second wireless communication devices comprise a Bluetooth™ transmitting/receiving interface operating according to a principle known to those skilled in the art. Other alternatives are possible for the wireless communication devices, such as for example Wi-fi transmitting/receiving interfaces based on the 802.11 standard family (e.g. 802.11b or 802.11g).

The communication system in accordance with the invention operates as follows. When the first and second near field communication devices are held next to each other, a first, short range (a few centimeter), communication link is established between the two devices so that they are able to exchange identification information. This first communication link enables to initiate a second, higher range (several meters), communication link 140 between the first and second wireless communication devices in such a way that the slave handheld apparatus 130 is able to join the pre-established call through this second communication link 140.

The master handheld apparatus may comprise a memory (not represented) for storing context parameters associated with the slave handheld apparatus, said context parameters defining data to be transmitted over the communication link, the slave handheld apparatus being able to join the pre-established call depending on the context parameters as will be described in more detail hereinafter.

Figure 2:
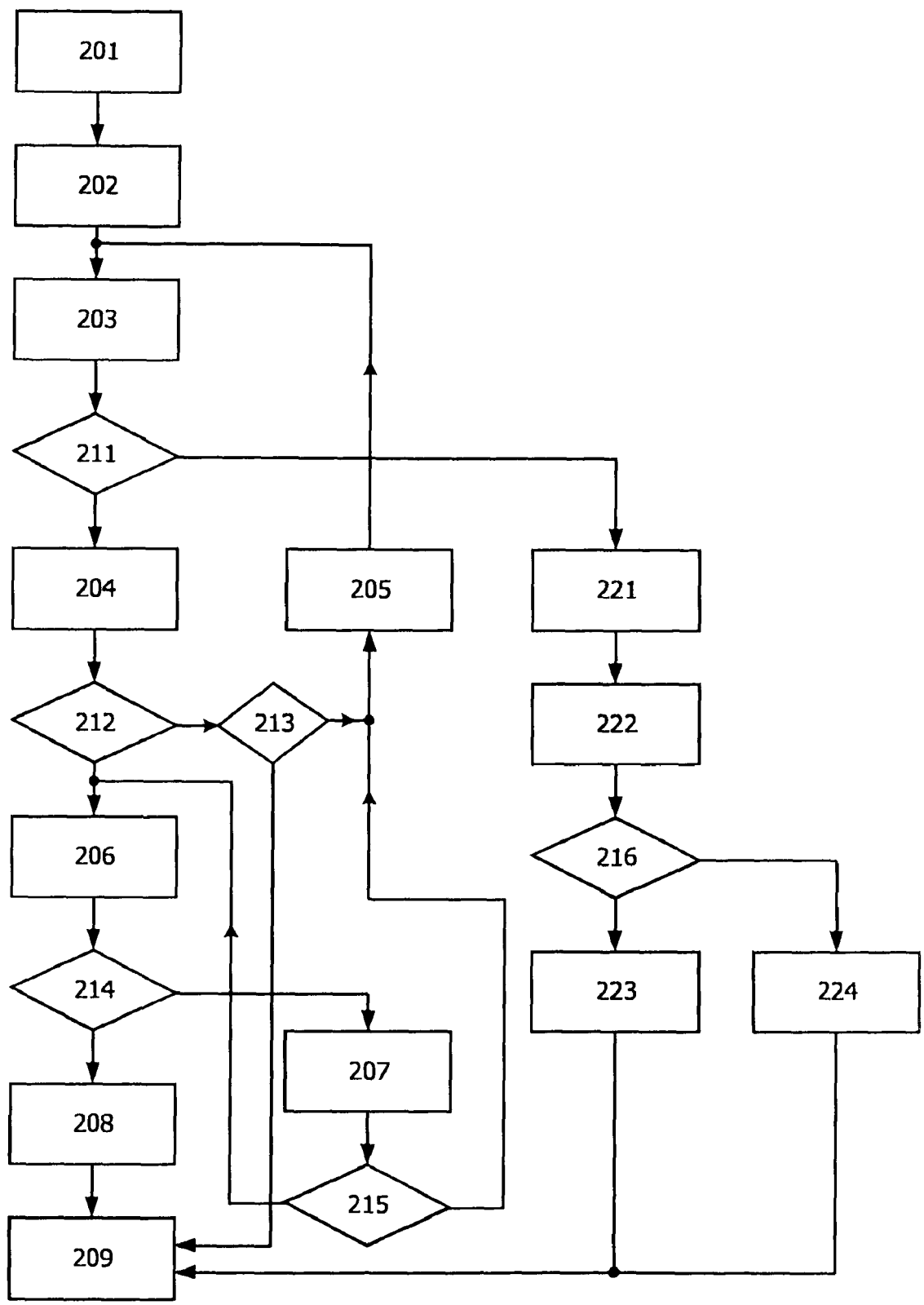
FIG. 2 is a block diagram of a communication method in accordance with the invention.

Turning now to FIG. 2, a block diagram of a detailed implementation of the communication method enabling the master or the slave handheld apparatus to make the slave handheld apparatus join or to join, respectively, a current service (e.g. a pre-established call placed between the master handheld apparatus and the remote communication apparatus) is disclosed.

In a first step 201, a new handheld apparatus is detected by each of the two handheld apparatuses. During this step, one handheld apparatus 100 or 130 receives the notification of the other handheld apparatus 130 or 100, when the handheld apparatuses are close to each other, based on their respective near field communication devices.

In the case of the NFC technology, one near field communication device acts as an NFC initiator while the other near field communication device operates in an NFC passive mode. In more detail, the step 201 comprises initializing the two handheld apparatuses 100 and 130, activating the NFC protocol, which includes the request for parameters in order to establish the NFC connection. The NFC protocol then activates the near field communication devices according to their respective role (passive or initiator). The two NFC devices are then able to exchange data as part of the Data Exchange Protocol DEP.

In a step 202, each handheld apparatus gets the address and communication parameters of the other handheld apparatus. During this step, the NFC initiator sends the address according to the wireless communication mechanism. If the Bluetooth™ communication mechanism is used, the address BD_ADDR (for Bluetooth Device Address) is sent. The address BD_ADDR uniquely identifies the handheld apparatus in a Bluetooth™ network. Indeed, each Bluetooth transceiver is allocated a unique 48-bit device address. It is divided into a 24-bit LAP (for Lower Address Portion) field, a 16-bit NAP (for Non-significant Address Portion) field and an 8-bit UAP (for Upper Address Portion) field. The near field communication device operating in the passive mode also sends the same set of information to the NFC initiator. At this stage, both near field communication devices have exchanged their respective addresses.

Optionally additional parameters can also be exchanged during this step. The additional information includes identification of services supported by the handheld apparatus associated with specific parameters, which will be described in more detail hereinafter.

If encryption is used in order to guaranty confidentiality of the data exchange over the wireless communication mechanism, the encryption key or any other relevant data (e.g. the PIN code for Bluetooth™) can be exchanged at this step.

In a step 203, each handheld apparatus is able to select a most probable service. In order to select the most probable service, each handheld apparatus 100 looks into a service registration table stored in a memory of said handheld apparatus.

The service registration table comprises, for example, in addition to the entry 'services' (for example "join a call", "play an audio/video sequence", etc) the following entries hereinafter referred to as parameters:

- the communication mechanisms supporting a service, for example Bluetooth™ or Wi-fi;
- a primary profile, for example audio and/or video and/or text capabilities;
- a secondary profile; if the primary profile cannot be used, a secondary profile is defined, for example, if the handheld apparatus 130 is invited to join a video conference and does not support the primary profile 'audio/video over Bluetooth™', but only support the secondary profile 'audio profile over Bluetooth™', the secondary profile will be chosen during a further negotiation step between the handheld apparatuses;

a priority number indicating the scanning order of the service registration table;

rules taking into account a current state of the handheld apparatus, for example, its battery state. A low battery state may privilege a communication mechanism that consumes less power provided that said communication mechanism maintains a sufficient quality of service. Said rules may be based on the use of Boolean expressions, or on the allocation scores to each service prior selecting the most probable service. In the latter case, the priority numbers may be used to differentiate services having identical scores.

Each of the handheld apparatuses selects the most probable service and associated parameters by scanning the services in the service registration table according to the scanning order and/or the rules.

In the present case, the handheld apparatus 100 is currently in a call (i.e. the most probable service is 'join a call'), and will invite the other handheld apparatus 130 to join the call.

If the other handheld apparatus 130 is in an idle state, a most probable service cannot be identified in the service registration table according to test 211, and the communication method goes to a step 221 for the other handheld apparatus 130, in which said apparatus is in a wait state and is ready to respond to a request for a service of the handheld apparatus 100 identified in steps 201 and 202. An apparatus is said to be in idle state if the apparatus is not in a state that could lead to the execution of one of the services identified in the table.

If the handheld apparatus 130 is not in an idle state, a most probable service is identified for this apparatus based on its service registration table, and the communication method goes to step 204.

In this step 204, a communication is established between the two handheld apparatuses. To this end, the wireless communication device of one handheld apparatus establishes a communication link 140 with the wireless communication device of the other handheld apparatus. This communication is established using the unique address provided by the NFC connection in step 202.

According to the Bluetooth™ communication mechanism, the wireless communication devices are part of a same piconet. A piconet is a collection of devices connected via Bluetooth™ in an ad hoc fashion. A piconet starts with two connected units and may grow to eight connected units. When a connection is established, one unit will act as a master and the other(s) as slave for the duration of the piconet connection. The master handheld apparatus 100 invites the slave handheld apparatus 130 to join the piconet, and the slave handheld apparatus 130 joins the piconet.

If the communication cannot be established between the two apparatuses over the selected communication mechanism, according to test 212, the handheld apparatus has to identify another communication mechanism (test 213) that supports the selected service. To this end, the different parameters of the service registration table are updated in a step 205 and the step 203 is executed again in order to select the most probable service and associated parameters.

If none of the communication mechanisms can be successfully established between the two handheld apparatuses, according to test 213, the method is terminated in a step 209 and the resources in terms of communication are released.

Once the communication link 140 has been established, a service request is initiated in a step 206. According to the Bluetooth™ communication mechanism, the master handheld apparatus 100 establishes a connection to the SDP (for Service Discovery Protocol) server of the wireless communication device of the slave handheld apparatus using the address BD_ADDR of the slave handheld apparatus 130. If the slave handheld apparatus 130 supports the profile associated with the service "join a Call", the master handheld apparatus 100 establishes the connection to the service with the slave handheld apparatus 130.

In the example of a conference call, the master handheld apparatus 100 acts as a Bluetooth™ Audio Gateway AG, while the slave handheld apparatus 130 acts as an Head Set HS. In that configuration, the microphone and speaker of the master handheld apparatus 100 are active. Other combination of profiles can be used depending on the selected communication mechanism, or the number of apparatuses joining the service.

If the master handheld apparatus has tried to establish a connection to the service over the communication link 140 but has failed to do so (according to test 214), the master and slave handheld apparatuses negotiate in a step 207 new parameters for the connection based notably on the secondary profile. If the service can be established with a different set of parameters, according to the test 215, the master handheld apparatus tries again to initiate the service request (step 206).

If the request for the service cannot be executed and no alternative is available, the master handheld apparatus updates the service registration table (step 205) and then reevaluates the most probable service (step 203).

Once the connection between the two handheld apparatuses has been established (according to test 214), the service is launched in a step 208. For the service "join a call", the slave handheld apparatus is ready to participate to the call over the selected communication mechanism. During this step, additional interaction with the user may be required for the purpose of security or for other purpose. For the service "join a call", an acknowledgement can be required to enable the slave handheld apparatus to join the call, or to confirm that he participates to the call as listener only. Additional user interactions such as a "mute option" may also be implemented at this stage.

Finally, upon request of one of the handheld apparatus, the connection is terminated in a step 209. In that case, the resources in terms of communication and connections are released. The state of the master handheld apparatus is updated accordingly to reflect the changes.

When the handheld service is in a wait state (step 221), it may receive a communication and service requests (step 222). In this case, the handheld apparatus tries to establish a communication link and, once the communication link has been established, a connection to the service. During the connection to the service, negotiations are possible, as described in step 207.

If the connection to the requested service is compatible with state and resources (test 216), the handheld apparatus accepts the service request and launches the service in a step 223.

Otherwise, the service request is rejected in a step 224 and the handheld apparatus notifies the other handheld apparatus if the communication mechanism permits to do so.

Once the handheld apparatus has rejected the service request, the communication method goes to the termination step 209.

It is to be noted that the role of the master and slave apparatuses is established at the time the conference call is established. The master is by default the apparatus that is in the pre-established call. If none of the apparatus is in a call, a local call can be established between the two apparatus, one acting as master and the other one as a slave.

The invention is not limited to the example of the conference call. The master handheld apparatus 100 does not need to be in a call to be joined by the slave handheld apparatus 130. A local call like full duplex walkie-talkie can be initiated between the master and slave handheld apparatus. For example, the master handheld apparatus opens a current session corresponding to the local call and the slave handheld apparatus joins the local call following the method described in accordance with FIG. 2.

Figure 3:
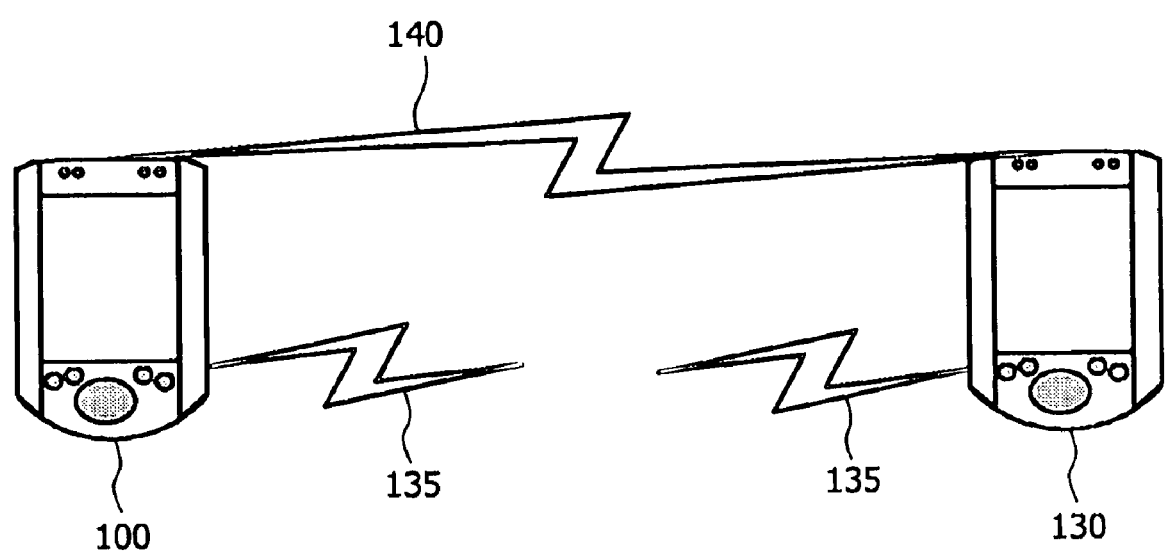
FIG. 3 shows another embodiment of a communication system in accordance with the invention.

According to another example, described in FIG. 3, the slave handheld apparatus 130 is a mobile phone or a PDA able to play a video or an audio sequence, a current sequence being played on the master handheld apparatus. The first and second near field communication devices then exchange identification information when they are held next to each other, using a first short range communication link 135. As a consequence, a second communication link 140 between the first and second wireless communication devices is initiated. Finally, the slave handheld apparatus 130 is able to join the current session through the second communication link 140, i.e. to play the audio/video sequence.

Still according to another example, video can be transmitted in addition to the voice signal.

It should be noted that the above-mentioned embodiments illustrate rather than limit the invention, and that those skilled in the art will be capable of designing many alternative embodiments without departing from the scope of the invention as defined by the appended claims.

Any reference sign in the following claims should not be construed as limiting the claim. It will be obvious that the use of the verb "to comprise" and its conjugations do not exclude the presence of any other steps or elements besides those defined in any claim. The word "a" or "an" preceding an element or step does not exclude the presence of a plurality of such elements or steps.

The invention claimed is:

1. A communication system comprising:
a master handheld apparatus comprising a first Near Field Communication (NFC) device and a first wireless communication device, a current session being held by said master handheld apparatus,
a slave handheld apparatus comprising a second NFC device and a second wireless communication device, the first and second NFC devices exchanging identification information when they are held next to each other so as to initiate a communication link between the first and second wireless communication devices, said first and second wireless communication devices then enabling the slave handheld apparatus to join the current session through the communication link, wherein at least one of the master handheld apparatus and the slave handheld apparatus selects a most probable service from a given list of one or more available services.

2. The communication system of claim 1, wherein the current session is a pre-established call placed between the master handheld apparatus and a remote communication apparatus over a communication network.

3. The communication system of claim 1, wherein the first and second wireless communication devices comprise a BLUETOOTH™ or a Wi-fi transmitting/receiving interface.

4. The communication system of claim 1, wherein each of the master handheld apparatus and the slave handheld apparatus initiates the communication link by selecting a most probable service from a given list of one or more available services.

5. The communication system of claim 1, wherein at least one of the master and the slave handheld apparatus maintain a service registration table identifying available services and detect that the most probable service cannot be executed, and the master handheld apparatus updates the services registration table in response to detecting that the most probable service cannot be executed.

6. A slave handheld apparatus for joining a current session held by a master handheld apparatus comprising a first Near Field Communication (NFC) device and a first wireless communication device, said slave handheld apparatus comprising:
a second NFC device and
a second wireless communication device, the second NFC device exchanging identification information with the first NFC device when they are held next to each other so as to initiate a communication link between the first and second wireless communication devices, said first and second wireless communication devices then enabling the slave handheld apparatus to join the current session through the communication link, wherein the slave handheld apparatus initiates the communication link by selecting a most probable service from a given list of one or more available services.

7. The slave handheld apparatus of claim 5, further comprising
a memory for storing context parameters associated with the slave handheld apparatus, said context parameters defining data to be transmitted over the communication link, the current session being joined as a function of the context parameters.

8. The slave handheld apparatus of claim 6, wherein the first and second wireless communication devices comprise either a BLUETOOTH™ or a Wi-Fi transmitting/receiving interface.

9. A master handheld apparatus comprising:
a first Near Field Communication (NFC) device and
a first wireless communication device, said master handheld apparatus being suitable for communicating with a slave handheld apparatus comprising a second NFC device and a second wireless communication device, a current session being held by said master handheld apparatus, wherein the first NFC device is exchanges identification information with the second NFC device when they are held next to each other so as to initiate a communication link between the first and second wireless communication devices, said first and second wireless communication devices then enabling the slave handheld apparatus to join the current session through the communication link, and wherein the master handheld apparatus initiates the communication link by selecting a most probable service from a given list of one or more available services.

10. The master handheld apparatus of claim 9, wherein the current session is a pre-established call placed between the master handheld apparatus and a remote communication apparatus over a communication network.

11. The master handheld apparatus of claim 9, wherein the first and second wireless communication devices comprise either a BLUETOOTH™ or a Wi-Fi transmitting/receiving interface.

12. The master handheld apparatus of claim 9, wherein the master handheld apparatus maintains a service registration table identifying available services and detects that the most probable service cannot be executed and updates the service registration table in response to detecting that the most probable service cannot be executed.

13. A communication method between a master handheld apparatus comprising a first Near Field Communication (NFC) device and a first wireless communication device, and a slave handheld apparatus comprising a second NFC device and a second wireless communication device, a current session being held by said master handheld apparatus, the method comprising:

exchanging identification information between the first and second NFC devices when they are held next to each other;

initiating a communication link between the first and second wireless communication devices; and enabling the slave handheld apparatus to join the current session through the communication link, wherein at least one of the master handheld apparatus and the slave handheld apparatus selects a most probable service from a given list of one or more available services.

14. The method of claim 13, wherein the current session is a pre-established call placed between the master handheld apparatus and a remote communication apparatus over a communication network.

15. The method of claim 13, wherein the first and second wireless communication devices comprise either a BLUETOOTH™ or a Wi-Fi transmitting/receiving interface.

16. The method of claim 13, further comprising:

storing, in at least one of the master and the slave handheld apparatus, a service registration table identifying the available services, wherein said initiating a communication link further includes:

said at least one of the master and the slave handheld apparatus selecting the most probable service from its stored service registration table, detecting whether the most probable service can be executed, and in response to detecting that the most probable service cannot be detected, updating said registration table.

* * * * *